United States Patent [19]
Yaginuma et al.

[11] Patent Number: 5,519,067
[45] Date of Patent: May 21, 1996

[54] FOAMABLE SILICONE RUBBER COMPOSITION

[75] Inventors: Atsushi Yaginuma; Yoshifumi Harada, both of Matsuida; Yoshio Inoue, Tokyo, all of Japan

[73] Assignee: Shin-etsu Chemical Co., Ltd., Tokyo, Japan

[21] Appl. No.: 536,792

[22] Filed: Sep. 29, 1995

[30] Foreign Application Priority Data

Sep. 30, 1994 [JP] Japan .................................. 6-261544

[51] Int. Cl.⁶ ..................................................... C08J 9/00
[52] U.S. Cl. .......................... 521/154; 521/123; 521/134
[58] Field of Search ..................... 521/154, 134, 521/123

[56] References Cited

U.S. PATENT DOCUMENTS 5,225,967  7/1993  Colas et al. .............................. 521/154
5,238,967  8/1993  Okawa ..................................... 521/154

*Primary Examiner*—Morton Foelak
*Attorney, Agent, or Firm*—Cushman Darby & Cushman

[57] ABSTRACT

This composition comprises (A) an organopolysiloxane having at least two SiOH groups in its molecule, (B) an organopolysiloxane having at least two SiH groups in its molecule, (C) a platinum family metal catalyst, and (D) a hydroperoxide. By using the hydroperoxide as a catalyst-retarding agent in cure reaction of a dehydrogenation system in which hydrogen is a foaming agent, this composition has a long pot life and can be cured and foamed to produce a foamed cured product in the form of a sponge having uniform cells.

12 Claims, No Drawings

FOAMABLE SILICONE RUBBER COMPOSITION

BACKGROUND OF THE INVENTION

1. Field of the Invention

The present invention relates to a foamable silicone rubber composition, and more particularly to a foamable silicone rubber composition which have a long pot life, and can be foamed and cured by heating to form a foamed cured product in the form of a sponge having uniform cells.

2. Description of the Prior Art

The foamable silicone rubber compositions capable of forming foamed cured products in the form of a sponge include two types of compositions, that is, compositions which inherently do not have any foamable mechanism per se but have been given foamability by being added with a foaming agent, and silicone rubber compositions which inherently have a cure mechanism accompanied by foamability (see, e.g., Japanese Patent Publication (kokoku) No. 45-12675).

Since the compositions having a cure mechanism accompanied by foamability generally have a short pot life, as an agent for retarding a curing catalyst (typically, a platinum catalyst) is added a polymethylvinyl cyclic compound (Japanese Patent Publication (kokoku) No. 52-42826), or acetylene alcohols (Japanese Patent Publication Nos. 53-5342, 53-24454, 53-48226, 3-26216, etc.) in a small amount to extend the pot life.

The foamable compositions to which a curing catalyst-retarding agent is added, however, have a problem that their pot life is only 20 minutes at longest from the time a composition is prepared by mixing the components at room temperature. Increase in the amount of the curing catalyst-retarding agent for extending the pot life, will result in the cells which are irregular and too large. Therefore, a foamable silicone rubber composition is required which has a longer pot life and is capable of producing a foamed cured product in the form of a sponge having uniform cells.

SUMMARY OF THE INVENTION

The inventors of the present invention have concentrated on research to find that it is possible to extend the pot life and to produce a foamed cured product in the form of a sponge by adding an organic compound containing a hydroperoxy group as a catalyst-retarding agent to a silicone rubber composition which can undergo dehydrogenation reaction between SiH groups and SiOH groups to form a foamed cured product.

Thus, one object of the present invention is to provide a foamable silicone rubber composition which has a long pot life and can be cured and foamed to produce a foamed cured product in the form of a sponge having uniform cells.

According to the present invention, there is provided a formable silicone rubber composition comprising:

(A) an organopolysiloxane having at least two units in its molecule represented by the following general formula:

$$R_a(OH)_b SiO_{[4-(a+b)]/2} \tag{1}$$

wherein R is a unsubstituted or substituted monovalent hydrocarbon group free of aliphatic unsaturated bonding, and a is an integer of from 0 to 2 and b is an integer of from 1 to 3, provided that a+b equals to from 1 to 3;

(B) an organopolysiloxane having, in its molecule, at least two units represented by the following general formula:

$$R_c(H)_d SiO_{[4-(c+d)]/2} \tag{2}$$

wherein R is as defined above, and c is an integer of from 0 to 2 and d is an integer of from 1 to 3, provided that c+d equals to from 1 to 3;

(C) a platinum family metal catalyst; and (D) an organic compound containing at least one hydroperoxide group.

The foamable silicone rubber composition of the present invention has an advantage of an extremely long pot life and can produce a cured product in the form of a sponge having uniform cells by being heat-cured.

DETAILED DESCRIPTION OF THE PREFERRED EMBODIMENTS

Component (A)

The organopolysiloxane of the component (A) is a base component of the composition of this invention and has at least two SiOH groups in its molecule as understood from having at least two units represented by said general formula (1) in its molecule. In other words, the dehydrogenation reaction between the SiOH groups and the SiH groups of the component (B) as described later results in forming a cured product in the form of a sponge.

In said general formula (1), the group R is a substituted or unsubstituted monovalent hydrocarbon free of aliphatic unsaturated bonds and includes, for example, an alkyl group having 1 to 6 carbon atoms, such as a methyl group, an ethyl group and a propyl group; a cycloalkyl group having 6 to 10 carbon atoms, such as a cyclohexyl group; an aryl group having 6 to 10 carbon atoms, such as a phenyl group and a tolyl group; a aralkyl group having 7 to 12 carbon atoms, such as a benzyl group, a 2-phenylethyl group and a 2-phenylpropyl group; a radical obtained by substituting at least part of hydrogen atoms contained in said groups by, for example, halogen atoms, such as a 3,3,3-trifluoropropyl group. Among these examples, preferred are a methyl group, a phenyl group and a 3,3,3-trifluoropropyl group, and particularly preferred is a methyl group.

With regard to the symbols a and b in the general formula (1), a is an integer of from 0 to 2 and b is an integer of from 1 to 3, provided that a+b equals to from 1 to 3. Accordingly, the unit represented by the general formula (1), namely, the unit having SiOH may be present either in the terminal ends of the molecular chain or on the way of the molecular chain.

The organopolysiloxane of the component (A) can have any other optional organosiloxane units as long as it has at least two units represented by said general formula (1). Such other organosiloxane units include, for example, an unit represented by the following general formula (3):

$$R_e SiO_{(4-e)/2} \tag{3}$$

wherein R is as defined above and e is an integer of from 1 to 3.

The molecular structure of the organopolysiloxane of the component (A) may be any of a straight chain, branched chain, cyclic or network structure and generally, a straight chain organopolysiloxane is used. The organopolysiloxane may be used singly or in a combination of two or more thereof. Further, the viscosity of the organopolysiloxane is not particularly limited and there can be used a polysiloxane having a viscosity as low as about 100 cP at 25° C. and otherwise a polysiloxane having a high viscosity of about 100,000,000 cP at 25° C., which is called "silicone raw rubber", preferably the organo polysiloxane having a viscosity of 100 to 100,000 cP at 25° C.

Typical organopolysiloxanes of the component (A) include, for example, organopolysiloxanes represented by the formula (4):

$$HO(R^1R^2SiO)_L H \qquad (4)$$

or the formula (5):

$$(R^3)_3SiO(R^1R^2SiO)_M[R^1Si(OH)O]_N Si(R^3)_3 \qquad (5)$$

wherein $R^1$ and $R^2$, which may be the same or different, are a unsubstituted or substituted monovalent hydrocarbon group free of aliphatic unsaturated bonding, $R^3$ is a unsubstituted or substituted monovalent hydrocarbon group free of aliphatic unsaturated bonding, L is an integer of from 20 to 3,000, preferably 100 to 2,000, M is an integer of from 2 to 20, and N is an integer of from 3 to 20.

Typical organopolysiloxanes suitably used among the above organopolysiloxanes include, for example, dimethylorganopolysiloxanes blocked by silanol groups at both terminal ends, without being limited thereto. The above organopolysiloxanes of the formula (4) may be used in combination with the above organopolysiloxanes of the formula (5).

Component (B)

The organopolysiloxane of the component (B) functions as a so-called crosslinking agent and has at least two units represented by said general formula (2) in its molecule. In other words, this organopolysiloxane has two or more SiH groups in its molecule and the SiH groups is subjected to dehydrogenation reaction with the SiOH groups in the organopolysiloxane of the component (A) as mentioned above to form a cured product. Furthermore, since hydrogen, which is the source of foams, is generated by the dehydrogenation reaction, foaming begins simultaneously with curing, the obtained cured product results in a foamed product in the form of a sponge.

The R in said general formula (2) has the same meaning as the R of the general formula (1) and, as examples thereof, there can be enumerated the same examples as in the general formula (1).

With regard to the symbols c and d in said general formula (2), c is an integer of from 0 to 2 and d is an integer of from 1 to 3, provided that c+d equals to from 1 to 3. Accordingly, the unit represented by the general formula (2), namely, the unit having a SiH group can be present in the terminal end of the molecule or on the way of the molecule. Further, the same unit can be present both in the terminal end and on the way.

As an unit other than that of the general formula (2), for example, the unit represented by said general formula (3) can be enumerated.

The molecular structure may be any of a straight chain, branched chain, cyclic or network structure and generally, a straight chain or cyclic organopolysiloxane is used. The organopolysiloxane may be used singly or in a combination of two or more thereof. Further, the viscosity of the organopolysiloxane is not particularly limited and generally, the viscosity is preferably 1 to 10,000 cP, and more preferably 1 to 1,500 cP, at 25° C.

The organopolysiloxanes of the component (A) are represented by, for example, the formula (6):

$$R^4(R^4R^4SiO)_x(R^4HSiO)_y Si(R^4)_3 \qquad (6)$$

wherein $R^4$ is a unsubstituted or substituted monovalent hydrocarbon group free of aliphatic unsaturated bonds, X is an integer of from 0 to 100 and Y is an integer of from 2 to 100.

The component (B) as mentioned above is generally used in such an amount that the SiH groups in the component (B) are 2 to 50 equivalents, especially 5 to 20 equivalents, per equivalent of the SiOH groups in the component (A). If the amount of the SiH groups is too small, foaming can not be satisfactorily effected, while, if the amount is too large, the physical properties of the cured product (foamed product) decreases since unreacted SiOH groups are left in the cured product. Generally, it is preferred that the component (B) is formulated in an amount of 0.1 to 50 parts by weight, especially 2 to 30 parts by weight based on 100 parts by weight of the component (A) as long as the above quantitative condition as to the SiH groups is satisfied.

Component (C)

The platinum family metal catalyst of the component (C) is a catalyst for accelerating the dehydrogenation reaction between the SiOH groups and the SiH groups as described above and there is known platinum catalysts, palladium catalysts, and rhodium catalysts. From an economical point of view, there are suitably used platinum catalysts, such as a fine powdery platinum metal adsorbed onto a support, for example, silica, alumina or silica gel; platinic chloride; chloroplatinic acid; complexes of chloroplatinic acid.$6H_2O$ with an olefin or divinyldimethylsiloxane; and an alcohol solution of chloroplatinic acid.$6H_2O$.

The platinum family metal catalyst is preferably used in an amount of generally 1 to 500 ppm, and especially 10 to 100 ppm, in terms of the platinum family metal, based on the component (A). If the amount is less than 1 ppm, curing and foaming may not be satisfactorily proceeded since the curing reaction is not effectively accelerated, while, even if the catalyst is formulated in an amount of exceeding 500 ppm, the curing reaction is not accelerated more than in 500 ppm and accordingly, it is uneconomical.

Component (D)

The component (D) is an organic compound containing at least one hydroperoxide group (—COOH) and functions as a catalyst-retarding agent for retarding the catalytic effect of the component (C). In other words, by formulating such a component, the pot life of the composition is extended and by heating this composition to foam and cure the same, it becomes possible to form a cured product in the form of a sponge having uniform cells.

Examples of the organic compound of the component (D) include, for example, methyl ethyl ketone hydroperoxide, cumene hydroperoxide, t-butyl hydroperoxide, 1-hydroxy-cyclohexyl hydroperoxide, 1,1,3,3-tetramethylbutyl hydroperoxide, decalin hydroperoxide, 1,1,2,2-tetramethylpropyl hydroperoxide, p-menthane hydroperoxide, and pinane hydroperoxide, to which examples are not limited. They may be used singly or in a combination of two or more thereof. Among these examples, preferred are methyl ethyl ketone hydroperoxide, cumene hydroperoxide, and t-butyl hydroperoxide.

Generally, the component (D) is preferred to be formulated in an amount of 1 to 5,000 ppm, particularly 10 to 1,000 ppm, based on the component (A). If the amount is less than 1 ppm, a catalyst controlling effect becomes insufficient so that the pot life can not be efficiently extended, while, if this component is formulated in an amount of exceeding 5,000 ppm, it becomes inefficient since a long time heating is required for curing and foaming.

Other components

In the present invention, if necessary, there can be formulated various additives, which are formulated in conventionally known foamable silicone rubber compositions, in addition to the above components (A) to (D), as long as the object of the present invention for extending the pot life and forming a foamed product having uniform cells is not injured. For example, vinyl group-containing organopolysiloxanes can be formulated in order to increase the reinforcement of the cured product in the form of a sponge and there can be suitably formulated inorganic fillers such as fumed silica, precipitated silica, diatomaceous earth, fine powdery silica, iron oxide, titanium oxide, aluminum oxide, aluminum silicate, zinc oxide and carbon black; antistatic agents; heat-resisting agent; fire retardant; pigments; glass fibers; and carbon fibers. Particularly, the inorganic fillers may be either untreated or surface-treated with an organic silicon compound such as organochlorosilane, organopolysiloxane and hexaorganosilazane.

Foamable silicone rubber composition

The composition of the present invention is readily prepared by mixing uniformly the essential components (A) to (D) and various additives formulated if necessary at room temperature. This composition has an extremely long pot life. For example, the pot life of conventional known foamable silicone compositions is about 20 minutes at 25° C. while the pot life of the present composition is 24 hours or more at 25° C.

This composition is molded using known molding apparatuses such as an injection molding apparatus and a cast molding apparatus and thereafter, by heating the molded item at a temperature of 80° to 200° C., for example, 120° C. for 1 to 120 minutes to foam and cure the same, a cured product in the form of a sponge. The thus obtained sponge-like cured product has uniform cells each of which diameter is generally 1 mm or less.

EXAMPLES

In the examples and comparative examples below, part(s) stand for part(s) by weight and viscosity was measured at 25° C.

Example 1

100 parts of a dimethylpolysiloxane blocked by silanol groups at both terminal ends having a viscosity of 20,000 cP, 5 parts of a dimethylpolysiloxane blocked by silanol groups at both terminal ends having a viscosity of 30 cP, and 10 parts of fine powdery silica (Aerosil R972, the tradename of Degussa Co.) were uniformly mixed at room temperature. The obtained mixture is referred to as silicone base (1).

This silicone base (1) was uniformly mixed with 0.4 part of the complex of chloroplatinic acid.6H$_2$O with divinylmethylpolysiloxane, and 0.03 part of methyl ethyl ketone hydroperoxide, followed by admixing 4 parts of an organohydrogenpolysiloxane having a viscosity of about 10 cP represented by (CH$_3$)$_3$SiO—[SiCH$_3$(H)O]$_{38}$—Si(CH$_3$)$_3$ so that the Si-H groups is about 10 equivalents per equivalent of the OH groups of the silanol group-containing polysiloxane. Thus, a foamable silicone rubber composition having a viscosity of 1,200 cP was prepared.

Upon foaming and curing the above composition under the condition of 120° C. for 30 minutes, there was obtained a cured product in the form of a sponge having uniform cells, each of which diameter is 1 mm or less, and having a density of 0.35 g/cm$^3$.

After the composition prepared as above was stored at 25° C. for 24 hours, it had a viscosity of 1,200 cP and also no foaming was confirmed. Further, upon foaming and curing the stored composition in the same manner as above, there was obtained a cured product in the form of a sponge having uniform cells, each of which diameter is 1 mm or less, and having a density of 0.38 g/cm$^3$.

Comparative Example 1

A foamable silicone rubber compound was prepared in accordance with exactly the same method as in Example 1, except that 0.05 part of 1-ethynyl-1-cyclohexanol was used in place of the methyl ethyl ketone hydroperoxide.

Upon foaming and curing this composition under the same condition as in Example 1, there was obtained a cured product in the form of a sponge. The cured product was confirmed to have non-uniform cells and also bump-like foams at a part of the surface.

Comparative Example 2

A foamable silicone rubber compound was prepared in accordance with exactly the same method as in Example 1, except that 0.05 part of 3,5-dimethyl-1-hexyn-3-ol was used in place of the methyl ethyl ketone hydroperoxide.

Upon foaming and curing this composition under the same condition as in Example 1, there was obtained a cured product in the form of a sponge. The cured product was confirmed to have non-uniform cells and also bump-like foams at a part of the surface.

Example 2

100 parts of a diphenyldimethylpolysiloxane copolymer blocked by silanol groups at both terminal ends having a viscosity of 20,000 cP [the content of OSi(C$_6$H$_5$)$_2$ units being 7 mol %], 5 parts of a dimethylpolysiloxane blocked by silanol groups at both terminal ends having a viscosity of 30 cP, and 10 parts of fine powdery silica (Aerosil R972, the tradename of Degussa Co.) were uniformly mixed at room temperature. The obtained mixture is referred to as silicone base (2).

This silicone base (2) was uniformly mixed with 0.4 part of the complex of chloroplatinic acid.6H$_2$O with divinylmethylpolysiloxane, and 0.05 part of methyl ethyl ketone hydroperoxide, followed by admixing 4 parts of the organohydrogenpolysiloxane used in Example 1 so that the Si-H groups is about 10 equivalents per equivalent of the OH groups of the silanol group-containing polysiloxane. Thus, a foamable silicone rubber composition having a viscosity of 1,200 cP was prepared.

Upon foaming and curing the above composition under the condition of 120° C. for 30 minutes, there was obtained a cured product in the form of a sponge having uniform cells, each of which diameter is 1 mm or less, and having a density of 0.31 g/cm$^3$.

After the composition prepared as above was stored at 25° C. for 24 hours, it had a viscosity of 1,200 cP and also no foaming was confirmed. Further, upon foaming and curing the stored composition in the same manner as above, there was obtained a cured product in the form of a sponge having uniform cells, each of which diameter is 1 mm or less, and having a density of 0.32 g/cm$^3$.

Example 3

The silicone base (2) prepared in Example 2 was uniformly mixed with 0.4 part of the complex of chloroplatinic acid.6H$_2$O with divinylmethylpolysiloxane, and 0.06 part of t-butyl hydroperoxide, followed by admixing 4 parts of the organohydrogenpolysiloxane used in Example 1 in the same manner as in Example 2. Thus, a foamable silicone rubber composition having a viscosity of 1,200 cP was prepared.

Upon foaming and curing the above composition under the condition of 120° C. for 30 minutes, there was obtained a cured product in the form of a sponge having uniform cells, each of which diameter is 1 mm or less, and having a density of 0.38 g/cm$^3$.

After the composition prepared as above was stored at 25° C. for 24 hours, it had a viscosity of 1,200 cP and also no foaming was confirmed. Further, upon foaming and curing the stored composition in the same manner as above, there was obtained a cured product in the form of a sponge having uniform cells, each of which diameter is 1 mm or less, and having a density of 0.42 g/cm$^3$.

Example 4

The silicone base (1) prepared in Example 1 was uniformly mixed with 0.4 part of the complex of chloroplatinic acid.6H$_2$O with divinylmethylpolysiloxane, and 0.05 part of methyl ethyl ketone hydroperoxide, followed by admixing 4 parts of the organohydrogenpolysiloxane used in Example 1 in the same manner as in Example 1. Thus, a foamable silicone rubber composition having a viscosity of 1,200 cP was prepared.

Upon foaming and curing the above composition under the condition of 120° C. for 30 minutes, there was obtained a cured product in the form of a sponge having uniform cells, each of which diameter is 1 mm or less, and having a density of 0.35 g/cm$^3$.

After the composition prepared as above was stored at 25° C. for 24 hours, it had a viscosity of 1,200 cP and also no foaming was confirmed. Further, upon foaming and curing the stored composition in the same manner as above, there was obtained a cured product in the form of a sponge having uniform cells, each of which diameter is 1 mm or less, and having a density of 0.41 g/cm$^3$.

Comparative Example 3

100 parts of a dimethylpolysiloxane blocked by silanol groups at both terminal ends, having a viscosity of 20,000 cP and containing 2 mol on average of vinyl groups per molecule, 5 parts of a dimethylpolysiloxane terminated with a hydroxyl group at both terminal ends having a viscosity of 30 cP, and 10 parts of fine powdery silica (the same as used in Example 1) were uniformly mixed at room temperature. The obtained mixture is referred to as silicone base (3).

This silicone base (3) was uniformly mixed with 0.4 part of a complex of chloroplatinic acid.6H$_2$O with divinylmethylpolysiloxane, and 0.03 part of methyl ethyl ketone hydroperoxide, followed by admixing 4 parts of an organohydrogenpolysiloxane having a viscosity of about 10 cP and containing about 1.5% by weight of hydrogen.

The thus obtained admixture, immediately after admixed, started to react and gelled.

What is claimed is:

1. A foamable silicone rubber composition comprising:
   (A) an organopolysiloxane having at least two units, in its molecule, represented by the following general formula:

$$R_a(OH)_bSiO_{[4-(a+b)]/2} \quad (1)$$

wherein R is a unsubstituted or substituted monovalent hydrocarbon group free of aliphatic unsaturated bonding, and a is an integer of from 0 to 2 and b is an integer of from 1 to 3, provided that a+b equals to from 1 to 3;
   (B) an organopolysiloxane having, in its molecule, at least two units represented by the following general formula:

$$R_c(H)_dSiO_{[4-(c+d)]/2} \quad (2)$$

wherein R is as defined above, and c is an integer of from 0 to 2 and d is an integer of from 1 to 3, provided that c+d equals to from 1 to 3;
   (C) a platinum family metal catalyst; and
   (D) an organic compound containing at least one hydroperoxide group.

2. A composition according to claim 1, wherein the organopolysiloxane of the component (A) further comprises, in its molecule, an unit represented by the following general formula (3):

$$R_eSiO_{(4-e)/2} \quad (3)$$

wherein R is as defined in claim 1 and e is an integer of from 1 to 3.

3. A composition according to claim 1, wherein the component (A) comprises a dimethylorganopolysiloxane blocked by silanol groups at both terminal ends.

4. A composition according to claim 1, wherein the component (A) is at least one compound selected from the group consisting of an organopolysiloxane represented by the formula (4):

$$HO(R^1R^2SiO)_LH \quad (4)$$

wherein $R^1$ and $R^2$, which may be the same or different, are a unsubstituted or substituted monovalent hydrocarbon group free of aliphatic unsaturated bonding, and L is an integer of from 20 to 3,000; and an organopolysiloxane represented by the formula (5):

$$(R^3)_3SiO(R^1R^2SiO)_M[R^1Si(OH)O]_NSi(R^3)_3 \quad (5)$$

wherein $R^1$ and $R^2$ are as defined above, $R^3$ is a unsubstituted or substituted monovalent hydrocarbon group free of aliphatic unsaturated bonding, M is an integer of from 2 to 20, and N is an integer of from 3 to 20.

5. A composition according to claim 1, wherein the organopolysiloxane of the component (B) further comprises, in its molecule, an unit represented by the following general formula (3):

$$R_eSiO_{(4-e)/2} \quad (3)$$

wherein R is as defined in claim 1 and e is an integer of from 1 to 3.

6. A composition according to claim 1, wherein the component (B) comprises an organopolysiloxane represented by the formula (6):

$$R^4(R^4R^4SiO)_x(R^4HSiO)_ySi(R^4)_3 \quad (6)$$

wherein $R^4$ is a unsubstituted or substituted monovalent hydrocarbon group free of aliphatic unsaturated bonding, X is an integer of from 0 to 100 and Y is an integer of from 2 to 100.

7. A composition according to claim 1, wherein the component (B) is present in such an amount that the SiH groups in the component (B) are 2 to 50 equivalents per equivalent of the SiOH groups in the component (A).

8. A composition according to claim 7, wherein the component (B) is present in an amount of 0.1 to 50 parts by weight based on 100 parts by weight of the component (A) as long as the quantitative condition with regard to the SiH groups as defined in claim 7 is satisfied.

9. A composition according to claim 1, wherein the platinum family metal catalyst of the component (C) is present in an amount of 1 to 500 ppm in terms of the platinum family metal, based on the component (A).

10. A composition according to claim 1, wherein the component (C) is a platinum catalyst.

11. A composition according to claim 10, wherein the platinum catalyst is selected from the group consisting of a fine powdery platinum metal adsorbed onto a support; chloroplatinic acid; platinic chloride; complexes of chloroplatinic acid.$6H_2O$ with an olefin or divinyldimethylsiloxane; and an alcohol solution of chloroplatinic acid.$6H_2O$.

12. A composition according to claim 1, wherein the component (D) is present in an amount of 1 to 5,000 ppm based on the component (A).

* * * * *